United States Patent Office 3,637,894
Patented Jan. 25, 1972

3,637,894
SYNTHESIS OF PROPYLENE FROM ETHYLENE
John C. Crano, Akron, and Elizabeth K. Fleming, Doylestown, Ohio, assignors to PPG Industries, Inc., Pittsburgh, Pa.
No Drawing. Filed Aug. 22, 1969, Ser. No. 852,495
Int. Cl. C07c 3/18, 11/06
U.S. Cl. 260—683 R
12 Claims

ABSTRACT OF THE DISCLOSURE

Ethylene is converted to propylene by intimately contacting the former with a mixture of a palladous halide, e.g., palladous chloride, fluoride salt of sodium, e.g., sodium fluoride, in a nitrilic reaction medium, e.g., benzonitrile.

BACKGROUND OF THE INVENTION

The value of a hydrocarbon material depends in part upon its availability and demand. It is desirable to convert ethylene for which there may be, in some circumstances, a large supply in comparison with demand, to other hydrocarbons which may be in short supply and, therefore, more valuable. Studies of the future demand for ethylene and propylene with their respective production capacities indicates that propylene will be in short supply while ethylene is in over-supply. During such periods, a process for converting ethylene into propylene will have significant utility.

The reaction of ethylene, palladous chloride and acetic acid for the production of vinyl acetate has been described. See British Pat. No. 928,739. Similarly, a process for preparing monofluorinated terminally unsaturated olefins of from 2 to 8 carbon atoms by the reaction of the corresponding non-fluorinated olefin with an alkali metal fluoride in the presence of palladous chloride in an aprotic reaction medium has been described. See U.S. Pat. No. 3,356,748. In the aforesaid process for producing monofluorinated terminally unsaturated olefins, any of the alkali metal fluorides, e.g., sodium, potassium or cesium fluoride, can be used. Cesium fluoride was found to be most advantageous. The aprotic reaction medium utilized in the process described in U.S. 3,356,748 is composed of one or more aprotic organic compounds selected from esters, ethers and aromatic nitro compounds which may contain ether or ester linkages. The addition to the reaction medium of an organic nitrile is said to lower the reaction temperature range from 120° C. to 350° C. to from 40° C. to 300° C.

BRIEF SUMMARY OF THE INVENTION

It has now been discovered that the use of a fluoride salt of sodium and a nitrilic reaction medium with a palladous halide is highly selective to the production of propylene from ethylene.

DETAILED DESCRIPTION

In the process described herein, ethylene is converted to propylene by heating a mixture of ethylene, a palladous halide and a fluoride salt of sodium in a nitrilic reaction medium at temperatures greater than 100° C.

The palladous halide used in the present process can be any of the conventional halogen salts of palladium (Pd$^{++}$), i.e., palladous chloride (PdCl$_2$), palladous fluoride (PdF$_2$), palladous bromide (PdBr$_2$) and palladous iodide (PdI$_2$), as well as the complex sodium salts of palladous chloride and fluoride, e.g., Na$_2$PdCl$_4$ and Na$_2$PdF$_4$. Of the aforementioned palladous halides, palladous chloride and palladous fluoride are preferred. Palladous chloride is economically preferred. All of the above recited palladous halides are either commercially available or obtainable by a halogen exchange reaction with a readily commercially available palladous halide such as palladous chloride. The complex sodium salt of palladous fluoride can be prepared by the reaction of sodium fluoride and palladous fluoride. The palladous halides used in the present process should be substantially anhydrous.

The amount of palladous halide utilized in the present process is not critical; however, amounts sufficient to produce propylene as the major unsaturated hydrocarbon product (other than ethylene), for the entire length of a run or until a subsequent addition of the material, should be used. Generally, an amount of palladous halide sufficient to produce a concentration of from about 0.01 to 1 molar in the nitrilic reaction medium is used. Higher concentrations can be used, if desired.

Fluoride salts of sodium have been found to have an unusual effect on the course of the reaction described herein. Other alkali metal fluoride salts, such as potassium fluoride, lithium fluoride and cesium fluoride, have been found to be substantially ineffective in converting ethylene to propylene in the process described herein. In addition, the combination of the fluoride salt of sodium and palladous halide also appears to have specific application to the process described above for the reason that sodium fluoride has been found to have little effect in causing the conversion of ethylene to propylene without palladous halide. Typical of the fluoride salts of sodium that can be employed are sodium fluoride (NaF), sodium bifluoride (NaHF$_2$) and sodium fluoroborate (NaBF$_4$). Sodium fluoride is preferred. These salts are also commercially available.

The amount of sodium fluoride utilized in the present process is not critical and will depend on the amount of palladous halide used. Generally, the mole ratio of palladous halide to fluoride salt of sodium can vary from about 1:2 to about 1:50 and typically will be about 1:10.

The use of a nitrilic material as the reaction medium has also been found to be necessary for the process described herein. Nitrilic solvents useful in the present process can be represented by the formula

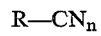

R—CN$_n$ wherein R is a hydrocarbyl free of aliphatic unsaturation of up to 18 carbon atoms and $n$ is a cardinal number of from 1 to 6. Preferably, R is a C$_1$–C$_6$ alkyl, C$_7$–C$_{10}$ alkaryl or aralkyl or C$_6$–C$_{10}$ aryl. Most preferably, R is phenyl. Specific examples of nitrile solvents that can be used in the present process include: benzonitrile, pivalonitrile, acetonitrile, p-toluonitrile, β-naphthonitrile, dodecyl cyanide, adiponitrile, and the like. These solvents are commercially available.

The amount of nitrilic solvent utilized in the present process is not critical; however, sufficient solvent should be used to provide a reaction medium that is fluid and non-viscous. That is, the reaction medium should have good fluidity so as to provide good gas-liquid contact and a rapid transfer of gas (ethylene) into and gas (propylene and ethylene) out of the system. Generally, the amount of solvent used will be sufficient to provide the 0.01 to 1 molar concentration of palladous halide described hereinbefore.

The above-described reaction can be carried out over a board temperature range. Generally, reaction temperatures will range from 100° C. to 200° C. Above 200° C., too much reaction of the nitrilic solvent with palladous halide is encountered. Preferably, the reaction is conducted between 150° C. and 180° C.

The pressure at which the present reaction is conducted is not critical and can vary from subatmospheric to superatmospheric. If the reaction is conducted continuously with a continual introduction of reaction ingredients to a reaction vessel, then the process is conveniently conducted at about atmospheric pressure. If, however, the process is conducted batchwise in, for example, an autoclave, the pressure will vary greatly and will depend on the amount of gaseous ethylene pressured into the autoclave. The process can be carried out by bubbling the olefin into the intimately mixed reaction mixture and removing gaseous products therefrom.

The time utilized for conducting the above-described reaction is not critical and can range from a few seconds to 20 hours or more. The length of time which the ethylene reactant is in contact with the reaction mixture will, of course, vary depending on the type of process selected, i.e., continuous or batch. Generally, contact times of from about 10 seconds to about 1 hour are used.

The present process is conducted under substantially anhydrous conditions for the reason that competing reactions leading to the formation of oxygenated products, e.g., acetaldehyde take place in the presence of water.

In conducting the present process, any convenient procedure for bringing the reaction ingredients together can be employed. For example, the palladous halide, e.g., the palladous chloride, nitrilic solvent and fluoride salt of sodium can be admixed and heated to reaction temperature followed by introduction of gaseous ethylene through the mixture. Alternatively, one or all of the reaction ingredients can be independently fed continuously to the reaction vessel which is provided with suitable means for intimately mixing all of the reaction ingredients and removing gaseous products. Intimate mixing can be achieved, for example, by placing the ingredients in a shaker tube and vigorously shaking or by employing a magnetic or mechanical stirrer.

The product gaseous stream resulting from the above-described process contains a number of products; however, the majority of the unsaturated hydrocarbon product is made up of unreacted ethylene and product propylene. The various gaseous products can be separated by ordinary procedures, such as fractional distillation, absorption methods, such as gas chromatography or by cooling the gaseous mixture to fractionally separate the products. Unreacted ethylene can, of course, be recycled. Metallic palladium appears to be produced as a result of the reaction. It can be collected, reconverted by standard procedures to palladous chloride and reused. Similarly, the fluoride salt of sodium and nitrilic solvent can also be recovered, purified and recycled for reuse.

In the preferred method for conducting the present process, a mixture of palladous chloride, sodium fluoride and benzonitrile are heated under pump vacuum to 160° C. The subatmospheric pressure of the system depends on the vapor pressure of the nitrilic solvent, in this case benzonitrile, at 160° C. Ethylene is then brought into contact with the reaction mixture.

The present process is more particularly described in the following examples which are intended as illustrative only since numerous modifications and variations therein will be apparent to those skilled in the art.

Example I

A mixture of 0.010 mole of palladous chloride, 0.10 mole of sodium fluoride and 40 milliliters of benzonitrile were heated under vacuum to 160° C. in a shaking autoclave with a capacity of 75 milliliters. Ethylene was then added to a pressure of 20 p.s.i.g. After four hours, the pressure in the autoclave had dropped to 11 p.s.i.g. the gaseous effluent from the autoclave was transferred to an evacuated sample bulb and examined with gas chromatography using a supported dibutyl maleate column at 45° C. and a silica gel column programmed from 50 to 200° C. The gas sample was found to contain 56.6 weight percent ethylene, 15.1 weight percent propylene and minor amounts of other hydrocarbon products.

Example II

The procedure of Example I was repeated except that no sodium fluoride was used in the reaction mixture. Only about 0.3 percent propylene was found.

Example III

The procedure of Example I was repeated substituting potassium fluoride, lithium fluoride and cesium fluoride, respectively, for the sodium fluoride used in Example I. The use of potassium fluoride instead of sodium fluoride resulted in the production of only about 0.66 weight percent propylene, whereas both lithium fluoride and cesium fluoride inhibited propylene formation, i.e., the amount of propylene formed was less than when no alkali metal fluoride salt was used.

Example IV

The procedure of Example I was repeated except that no palladous chloride was used. No perceptible reaction was found to occur.

The results of Examples I–IV are summarized in Table I.

THE REACTION OF ETHYLENE AND PALLADIUM CHLORIDE IN BENZONITRILE [1]

| Example | Salt | Weight percentages in product gas mixture of— | |
|---|---|---|---|
| | | $C_2H_4$ | $C_3H_6$ |
| I | NaF | 56.6 | 15.1 |
| II | None | 68.0 | 0.28 |
| III | KF | 85.0 | 0.66 |
| III | LiF | 85.6 | 0.047 |
| III | CsF | 96.3 | 0.062 |
| IV | NaF [2] | 99.9 | |

[1] 40 ml. of solvent, 0.010 mol of $PdCl_2$, 0.10 mol of salt, 160° for 4 hrs.
[2] No $PdCl_2$ present.

Example V

A mixture of 0.010 mole of palladous chloride, 0.10 mole of sodium fluoride and 40 milliliters of adiponitrile was heated under vacuum to 175° C. in a shaking autoclave, with a capacity of 75 milliliters. Ethylene was then added to a pressure of about 20 p.s.i.g. After four hours, the pressure had dropped to 13 p.s.i.g. The product gas was transferred to an evacuated sample bulb and examined with gas chromatography in a manner similar to Example I. The gas sample was found to contain 68.5 weight percent ethylene and 8.4 weight percent propylene.

Example VI

The procedure of Example I was repeated except that 40 milliliters of nitrobenzene were substituted for benzonitrile. Only 0.77 weight percent propylene was produced.

When cesium fluoride was substituted for sodium fluoride in the present example, only 0.055 weight percent propylene was obtained.

Example VII 0.10 mole of sodium fluoride, 0.010 mole of palladous chloride and 40 milliliters of adiponitrile were heated under vacuum to 175° C. in a shaking autoclave. Propylene was added to a pressure of about 30 p.s.i.g. After two hours, the pressure had dropped to 11 p.s.i.g. The product gases were removed from the autoclave and examined with gas chromatography. The product gas was found to contain 94.2 percent propylene, 0.6 percent propane, 0.7 percent 2-fluoropropene, 1.1 percent 3-fluoropropene, 1.4 percent chloropropene and 2.0 percent carbon dioxide. No evidence for the formation of any higher molecular weight unsaturated hydrocarbon product was obtained.

While there are above described a number of specific embodiments of the present invention, it is obviously possible to produce other embodiments and various equivalent modifications thereof without departing from the spirit of the invention.

Having set forth the general nature and specific embodiments of the present invention, the scope thereof is now particularly pointed out in the appended claims.

We claim:

1. A process for producing propylene from ethylene which comprises mixing ethylene with a reaction medium consisting essentially of palladous halide, a fluoride salt of sodium and a nitrilic solvent under substantially anhydrous conditions and at temperatures of from about 100° C. to about 200° C. and recovering propylene so produced.

2. A process according to claim 1 wherein the temperature of the reaction medium is from about 150° C. to about 180° C.

3. A process according to claim 1 wherein the fluoride salt of sodium is selected from the group consisting of sodium fluoride, sodium bifluoride and sodium fluoroborate.

4. A process according to claim 1 wherein the nitrilic solvent is represented by the formula $$R-CN_n$$

wherein R is a hydrocarbyl free of aliphatic unsaturation of up to 18 carbon atoms and $n$ is a number of from 1 to 6.

5. A process according to claim 4 wherein the nitrilic solvent is selected from the group consisting of benzonitrile, pivalonitrile, acetonitrile, p-toluonitrile, adiponitrile and β-naphthonitrile.

6. A process according to claim 1 wherein the palladous halide is present in concentrations of from about 0.01 to 1 molar.

7. A process according to claim 1 wherein the mole ratio of palladous halide to fluoride salt of sodium is from about 1:2 to about 1:50.

8. A process for preparing propylene which comprises introducing ethylene into a reaction medium consisting essentially of palladous chloride, sodium fluoride and nitrilic solvent at temperatures of from about 100° C. to about 200° C. and recovering propylene so prepared.

9. A process according to claim 8 wherein the nitrilic solvent is represented by the formula $$R-CN_n$$

wherein R is a hydrocarbyl free of aliphatic unsaturation of up to 18 carbon atoms and $n$ is a number of from 1 to 6.

10. A process according to claim 9 where in the nitrilic solvent is selected from the group consisting of benzonitrile, pivalonitrile, acetonitrile, p-toluonitrile, adiponitrile and β-naphthonitrile.

11. A process according to claim 8 where the palladous chloride is present in concentrations of from about 0.01 to 1 molar.

12. A process according to claim 8 wherein the mole ratio of palladous chloride to sodium fluoride is from about 1:2 to about 1:50.

References Cited

UNITED STATES PATENTS

| | | | |
|---|---|---|---|
| 2,453,144 | 11/1948 | Lovell et al. | 260—683 |
| 3,356,748 | 12/1967 | Cramer et al. | 260—653.3 |
| 3,431,316 | 3/1969 | Banks | 260—683 |

DELBERT E. GANTZ, Primary Examiner

C. E. SPRESSER, Jr., Assistant Examiner

U.S. Cl. X.R.

260—653.3